United States Patent

[11] 3,572,943

| [72] | Inventor | Ferrand D. E. Corley |
| | | 2 Wimbleton Crescent, Islington, Ontario, Canada |
| [21] | Appl. No. | 722,867 |
| [22] | Filed | Apr. 22, 1968 |
| [45] | Patented | Mar. 30, 1971 |

[54] COLOR FILM EVALUATION SYSTEM
4 Claims, 5 Drawing Figs.

[52] U.S. Cl. ............................................. 356/175,
35/28.3, 356/191, 356/192, 356/194
[51] Int. Cl. ....................................................... G01j 3/46,
G01j 3/52
[50] Field of Search............................................ 356/177,
175; 355/(Inquired); 352/(Inquired); 35/28.3,
28.5, 53; 356/173, 174, 191—194

[56] References Cited
UNITED STATES PATENTS

| 2,190,553 | 2/1940 | Tarr | 356/175-X |
| 2,446,052 | 7/1948 | Loessel et al. | 356/175 |
| 2,949,809 | 8/1960 | Weisglass et al. | 356/175 |
| 3,323,431 | 6/1967 | Land | 356/175-X |
| 3,380,338 | 4/1968 | Mitchell | 356/175-X |
| 3,443,868 | 5/1969 | Mitchell | 356/175-X |

FOREIGN PATENTS

| 633,539 | 5/1959 | Great Britain | 356/175 |
| 459,762 | 9/1949 | Canada | 356/175 |
| 1,185,396 | 1/1965 | Germany | 356/175 |

Primary Examiner—Ronald L. Wibert
Assistant Examiner—Warren A. Sklar
Attorney—George A. Rolston

ABSTRACT: This specification discloses a system for evaluating the color balance density and contrast of color film by means of projecting the color film onto a screen and visually comparing it with a standard reference image on the screen, and to apparatus for such system.

Patented March 30, 1971

3,572,943

INVENTOR
FERRAND D. E. CORLEY
BY: *George A. Rolston*

PATENT AGENT

COLOR FILM EVALUATION SYSTEM

This invention relates to a system for evaluating the color balance of color film, color slides and the like, and more particularly to a method and apparatus for evaluating both color balance, and also the density and contrast, of such color films or color slides, for the purpose of subsequently reprinting the same making appropriate variations in the color balance from notations made during such evaluation.

The need for accurate color balance of color films now exists. In the past, films slides and the like were viewed in a darkened room designated for screening, and under these circumstances while the color balance of a film or slide might vary considerably, the viewers eye automatically compensated for such variation and to the viewers, the color balance would appear natural and lifelike. However, today the introduction of color television on which colored slides and colored motion picture film are viewed in relatively brightly lit rooms has made the accurate color balance of slides and films a much more critical mater since the human eye under these circumstances will automatically, subconsciously compare the color image on the television screen with the overall color balance of the room or surroundings, and any discrepancy in the color balance of the image on the screen will be immediately detected. However, notwithstanding this situation, agencies and film studios still conduct the prescreening and evaluation of films and slides in a darkened screening room.

The present invention therefore provides a system of evaluating color balance of films, which term is deemed to include both motion picture films and slides by screening the same on a screen upon which a standardized reference image is projected or established by any suitable means, the film being automatically evaluated by the human eye with reference to such standard image. In many cases, an expert will find that this is all that is required, to enable him to determine exactly how the color balance of the film should be adjusted, but, the invention also comprehends within the overall system, the additional step of adjusting the color balance of the image of the film being screened by predetermined increments, until the closest match is obtained to the reference image, such predetermined increment being subsequently reapplied to the adjustment of the image of the film during reprinting.

In order to achieve this objective it is desirable that the standard reference image should comprise a series of panels or strips each of which comprises a precise balancing of predetermined densities of the three basic colors, the three colors together providing a gray appearance of a predetermined density, the densities of the panels varying in predetermined increments from very dark to very light gray. A reference image of this type is usually called a "staircase wedge," one early form of which was described in an article entitled "New C.B.C. Vidicon Tele-Cine Operating Standards" by S. F. Quinn and J. Bowie Dickson, Journal of the S.M.P.T.E. Vol. 73, Dec. 1964, No. 12, pgs. 1009 to 1014. The image referred to in this article consisted of a slide known as the "Holmes-C.B.C." slide and in this case, the image was produced on black and white silver-image film. The image comprised two groups of 10 separate strips varying in increments of density, the strips being printed from left to right and from right to left. However, this type of staircase wedge image was suitable only for use in black and white television, and for use in color television it is considered essential that each of the strips in the image transmit a precise balance of red, green and blue light at predetermined intensities, usually equal intensities, and this cannot be achieved generally speaking using a silver image due to the fact that the silver image does not pass equal amounts of red, green and blue light at varying densities, the denser the silver grains, the more the short wavelengths of light will be scattered. One particularly preferred method of forming such a slide is described in my copending U.S. Pat. application Ser. No. 699,174 entitled "Gray-Scale Test Slide and Method of Production," filed Jan. 19, 1968 by Ferrand D. E. Corley, but the present invention does not exclude the possibility of the production of such a reference image by other means. Thus for example, it is possible that the reference image could be formed by forming strips of a neutral color of a different density on a transparent support by means of a vacuum or electrolytic coating with organo-metallic coating materials. Alternatively, it is possible that such strips can be formed and applied directly to the screen upon which the film is to be screened, and could be illuminated by suitably masked white light. Thus, the invention is not limited to any one form of reference image.

The foregoing and other advantages will become apparent from the following description of a preferred embodiment of the invention, which is now given by way of example only with reference to the following drawings in which like reference devices refer to like parts thereof throughout the various views and diagrams and in which.

Figure 1:
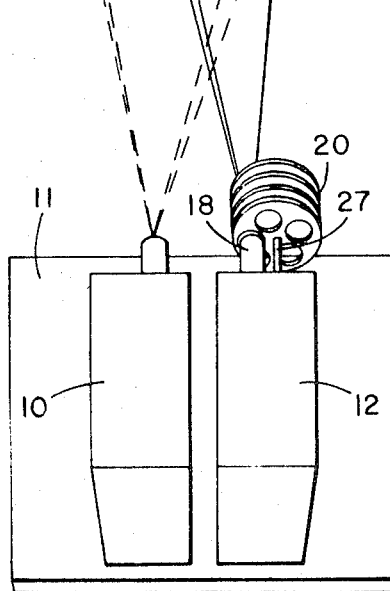
FIG. 1 is a schematic perspective illustration of the system in operation.
Figure 5:
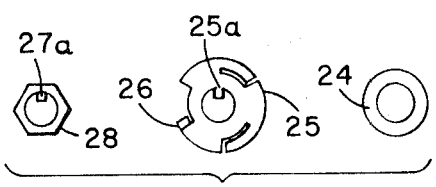
FIG. 5 is a composite illustration showing the means of mounting the filter wheel.

The apparatus required for the operation of the system, according to this preferred embodiment of the invention, is illustrated in FIG. 1, and will be seen to comprise a slide projector 10, a film or slide projector 12, depending upon whether motion picture film or color slides are to be evaluated, and a screen 14 upon which images from both projectors 10 and 12 are projected simultaneously. The slide projector 10 according to this preferred embodiment is of any suitable type adapted to accept slides such as those illustrated in FIGS. 2 and 3 of any conventional type, and projects the same accurately onto screen 14. The projector 12, if used for motion picture film, should preferably be of the type which can be run both forward and backwards, and should incorporate an adjustable lens iris (not shown) and should have attached thereto a group of filter wheels, to be described in more detail hereinafter, which may be interposed in any one of many combinations into the light beam passing from projector 12 onto screen 14. When operating according to the present invention, the projector 12 is so arranged and positioned and focused that the image therefrom appears in the center rectangular portion of the screen, such image being designated by the reference 16. The projector 10 is so arranged and focused that the image projected thereby fills the rectangular border of the screen surrounding the central image 16. The projector 12 includes a conventional assembly of lenses (not shown) indicated generally as 18 which are combined with a suitable lens iris for adjusting the apertures and thereby varying the intensity of the projected image. In order to vary the color balance of the projected image, the four filter wheels 20 are positioned in front of lens 18 on projector 12 so that each such filter wheel 20 may be rotated separately to bring any one of the five openings 21 in each wheel 20 into registration with lens 18. Each filter wheel 20 is provided with five registration slots 22 and a central opening 23 for mounting of the same on shaft 27 extending from projector 12. Referring to FIG. 5, each of the wheels 20 is provided with a spring washer 25, having a registration key 25a thereon, for interengagement with a corresponding keyway 27a in shaft 27, and a plurality of spring tongue members 26, one of which is folded over for interengagement with registration opening 22. A washer 24 is placed between spring washer 25 and the next adjacent filter wheel 20. At the end of the shaft 27 a retaining nut 28 is provided for holding the whole assembly in position. In order to locate any one of the filter openings 21 in the dark, each such filter opening 21 is identified by one or more notches 29 of sufficient size and depth that they can be readily counted by touching.

Figure 2:
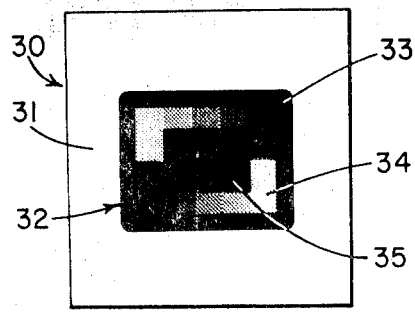
FIG. 2 is an elevational view of a slide carrying the reference image.

As stated above, the standard reference staircase wedge image may be created in a variety of ways. However, in this preferred embodiment of the invention such standard reference image is created by means of a slide as shown in FIG. 2. The slide is indicated generally as 30 and comprises a mount 31 supporting within it a transparency indicated generally as 32. The transparency 32 comprises an outer rectangular black border portion 33, a central rectangular totally black portion 35 which will pass no light whatever, and the remaining rectangular peripheral portion comprises a so-called double staircase wedge made up of a series of strips or panels 34. It will be noted that in each of the two portions of the wedge, there are five such strips 34 varying from a dark gray to a light gray. As stated, the staircase wedge portions of the transparency 32 comprise dye images, namely, the strips 34 each of which are formed by separate exposures of a portion of color film so as to provide strips 34 each of which incorporate predetermined density levels of color, thus appearing generally gray to the naked eye, and manufactured according to the invention described in my aforesaid application Ser. No. 699,174. The slide 30 when placed in the slide projector 10 and projected onto the screen 14 will produce an image having a central rectangular portion 16 which is defined by the black portion 35 of the slide 30 in which substantially no light is projected, the rectangular peripheral portion of the screen being filled with an image corresponding to the double staircase wedge strips 34 of the transparency 32. In this way, the image projected by projector 12 can be focused and adjusted so as to fall precisely on the blank central portion of the screen 14 and provide the image 16 without any interference whatever from the image projected by projector 10 thus enabling the naked eye to watch the image falling in the central rectangular portion 16 while continuously making a subconscious comparison with the staircase wedge image falling in the outer rectangular portion. The fact that the naked eye can compare a color image such as that falling in the portion 16 with an image which to all intents and purposes appears to be nothing but a series of gray strips around the border while being somewhat unexpected and surprising, has been found by experimentation to be highly effective, and a completely untrained observer can detect without any trouble even slight anomalies of color balance in the image projected by the projector 12. Obviously, somewhat more experience is required in order to determine which filter should be applied to remedy such anomaly but such experience is readily acquired by means of practice.

Figure 3:
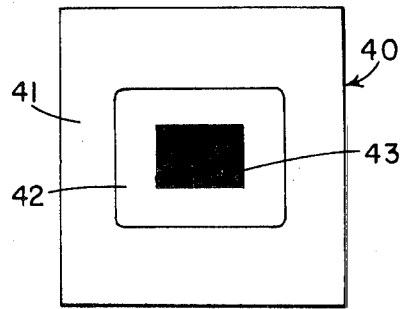
FIG. 3 is an elevational view of a slide carrying a mask image.
Figure 4:
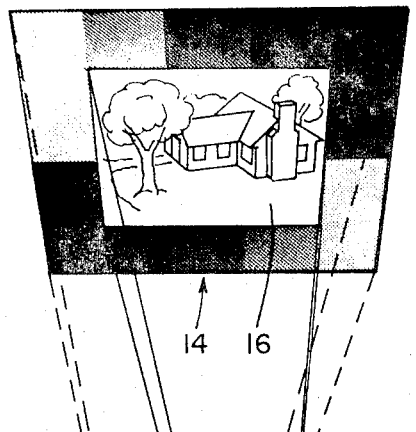
FIG. 4 is an elevational view of a filter wheel.
Figure 4:
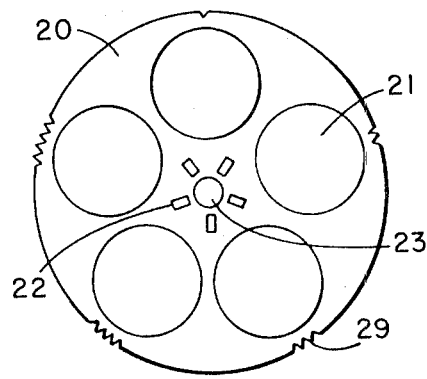

Before the system of FIG. 1 can be operated satisfactorily, it is generally speaking, found to be preferable that the intensity of light projected by projector 10 should be more or less precisely balanced with the intensity of light projected by the projector 12, such intensity being measured of course at the screen 14. In order to provide a simple means for matching such light intensities, the slide illustrated in FIG. 3 is provided. This slide 40 will be seen to comprise a slide mount 41 and a transparency comprising a central totally black image 43 and a rectangular border portion 42 which is totally transparent. When this slide 40 is placed in projector 10 the slide 30 being removed, projector 10 projects an image which consists of a central portion 16 which is unlit and therefore appears dark and a rectangular border portion which is bright and uniformly illuminated. The projector 12 is then switched on on so-called "open gate" and the image projected by such projector 12 is focused so as to lie precisely within the unlit central portion 16. The screen 14 will then be illuminated by the two projectors 10 and 12 in separate areas, and by means of adjusting the lens aperture of projector 12, or by means of adjusting the lens aperture of projector 10 if projector 10 is provided with such an adjustment, the light intensity of the two projectors can be immediately brought into balance. While performing this balancing operation, it is also possible by means of moving either projector 10 or 12 forwards or backwards in relation to the other, to ensure that the size of the two images is precisely matched, so that the central unlit portion of the image projected by the projector 10 is precisely filled by the image projected by the projector 12. This step is generally found to be desirable as a preliminary procedure, and it is not necessary to repeat this step before the screening of each slide or each motion picture film in projector 12, generally speaking, one such lining up and balancing being sufficient for a fairly extended period of operation.

In addition to this preliminary intensity balancing step, it is also found to be desirable, in certain cases, where the light source in projector 10 differs from the light source in projector 12 due to differences in temperature or the like, that the color balance of the light projected by projectors 10 and 12 should also be brought into balance. This is achieved by means of separate filter media (not shown), or by use of a single light source divided by mirrors and directed into both projectors. It has already been mentioned that there are four filter wheels 20 each of which is provided with five filter openings 21. The openings 21 will be designated 1 to 5, corresponding to the number of notches 29. Three of the four filter wheels 20 will be provided with subtractive color filters such as yellow, cyan and magenta in varying ranges of density from 0.05 to 0.2. The fourth wheel 20 will be provided with neutral filters in varying densities. In each of the four wheels 20, the opening No. 1 will be empty, that is to say it will contain no filter whatever and will pass all the light unchanged. Opening No. 2 will contain the palest, i.e., the 0.05 filter. Opening No. 3 will contain the 0.1 density filter. Opening No. 4 will contain the 0.15 density filter, and opening No. 5 will contain the 0.2 density filter. In order to provide that any one of the four filter wheels may be operated so as to either increase or decrease the density of that particular color, the projector 12 is arranged to project under normal conditions with each of the four filter wheels on opening No. 3, i.e. the 0.1 density filter in each case. In this way, any one of the four wheels 20 can be moved two spaces in either direction so as to either increase or decrease that particular color by predetermined increments depending upon whether the filter wheel is moved one space or two spaces, clockwise or anticlockwise.

Thus it will be seen that under normal operating conditions, and in any event when aligning both projectors 10 and 12 with one another and balancing their light intensity and color intensity, it is desireable that each of the four filter wheels should be operated at 0.1 density on opening No. 3 so that there will be a certain degree of restriction of the intensity of light projected by projector 12 by reason of the fact that even on the so-called open gate condition, i.e., where there is no film whatever in the projector, the projected light must pass through four separate filters of 0.1 density. Generally speaking, it will be found desirable to arrange that projector 12 should have a somewhat more powerful light source than projector 10 so that the intensity of light projected on screen 14 by projector 12 may be at least equal to that of projector 10 notwithstanding the interposition of such filters.

Obviously the filter densities stated here are not limiting and other densities can be selected as a matter of choice.

As stated above, it is considered desirable that in addition to the balancing of the light intensity prior to operation of this system, the light projected by projectors 10 and 12 should also be balanced as to each of the three colours and this is preferably achieved by the use of additional separate filter media such as slides embodying filters which may be interposed in lens 18 in any well-known manner (not shown). A selection of such filter media will of course be provided with projector 12, and by a process of trial and error, the most suitable blend of such filter media will be obtained after which it need not be changed.

As stated above, the operation of the system after the initial setup and focusing of projectors 10 and 12 and balancing of light and color comprises essentially the steps of projecting or otherwise establishing a standard reference image on a portion of a screen, leaving a portion of the screen blank, and projecting an image of the film or slide to be evaluated onto such blank portion of the screen and adjusting the color balance of such image and adjusting the light intensity of such image if necessary so as to bring such color balance and light intensity into correspondence with such standard reference image.

Obviously, there are many variations which may be put into practice without departing from the scope of the invention, and some of such variations will now be described. Thus for example, the slide projector 10 can be arranged so as to project from the rear of screen 14, screen 14 being of the rear projection type, and projector can be operated from the front of screen 14 in a manner described. A second possible alternative is that the standard reference image comprising the staircase wedge and its masked portion can be in any other shape, i.e., circular, octagonal or the like, leaving a circular or octagonal space in the center into which the image from the projector 12 is directed. It will be understood that the image from projector 12 can be made to match almost any shape of standard reference image by the use of a suitable mask or cutoff member incorporated in the projector 12. Obviously, the standard reference image need not extend around the full extent of the image to be evaluated. Thus for example, the staircase wedge could conceivably run up and down each side of the screen 14 while leaving the entire central portion of the screen empty from its upper edge to its lower edge. Alternatively, such standard reference image could be projected onto one side or the top or bottom only. However, generally speaking, such alternatives will be found to be less satisfactory since the eye will not respond as readily to such an arrangement as in the case of the arrangement shown in FIG. 1 in which the reference image is projected entirely around the image to be evaluated.

A further possibility is that the standard reference image can be created by means of strips of light restrictive neutral gray material applied directly to the screen 14 itself in the pattern shown in FIG. 1 or in any other suitable pattern. In this case, the projector 10 will be replaced by a light source provided with a mask such as that shown in FIG. 3 and focused and directed so as to illuminate only the standard reference image portion of the screen 14 to a predetermined level of light intensity.

However, all of these variations will be readily apparent to persons skilled in the art having understood the basic principle of the present invention. It also will be understood that in the case of a motion picture, as the film is run through projector 12, some portions of the film will appear in perfect balance. However, as a portion is reached which appears to be out of balance for some reason, the projector 12 is stopped and the various filter wheels 20 are moved until the image 16 on the screen 14 is brought into balance. The projector 12 may then be run backwards and forwards one or twice to ensure that the entire passage is identified, and careful notes made as to the filters that have been added or subtracted, after which screening may continue until a further adjustment appears to be required. After all such adjustments are duly noted, the film may be then returned to the processing laboratory and reprinted once again, the technician applying the various additions or subtractions in the film printer in well-known manner thereby bringing the entire length of film into balance with the standard reference image.

As a further alternative it may be possible to project the standard reference image over the entire screen without a masked off portion, and interrupt the projection intermittently in synchronism with the film projector, i.e., at 24 frames per second.

The foregoing description is of a preferred embodiment by way of example only. The invention comprehends all such variations as come within the scope of the appended claims.

I claim:

1. A method for visually evaluating the color balance of a color film such as a motion picture film or a slide comprising the steps of:

forming a plurality of neutral gray color tone bands defining a reference image on a portion of a projection screen, said forming step comprising forming a plurality of distinct bands of different neutral gray color intensity, each such band embodying a predetermined balanced intensity of red, green and blue respectively, whereby to give a neutral gray color appearance;

simultaneously projecting a film image from said color film to be evaluated onto another portion of the same said screen so as to appear adjacent to said reference image;

simultaneously viewing said images and comparing the color intensities of said film image with said reference image to detect any lack of color balance therebetween; and, adding to or subtracting from one or more colours of said film image while the same is being projected to bring the same into color tone balance with at least one of said neutral gray color tone bands of said reference image.

2. The method as claimed in claim 1, wherein said step of forming said reference image comprises forming said reference image on a rectangular peripheral portion of said screen, the central rectangular portion being left blank, and wherein said step of simultaneously projecting said film image comprises projecting said film image onto said screen in said rectangular blank central portion on said screen.

3. The method as claimed in claim 1, including the step of initially adjusting the overall light intensity of said reference image and said film image to bring the same into balance.

4. The method as claimed in claim 1, wherein said step of forming said reference image comprises projecting light through a reference slide transparency onto said screen to form a projected reference image, and wherein said step of projecting said film image is established by means of projecting light through a color film transparency onto said screen to form a projected film image, and including the step of balancing said projected reference image and said projected film image both as to color balance and intensity.